(12) United States Patent
Kulkarni et al.

(10) Patent No.: US 11,552,800 B2
(45) Date of Patent: Jan. 10, 2023

(54) APPARATUS, SYSTEM AND METHOD FOR OPERATING A SOFTWARE-DEFINED NETWORK

(71) Applicant: Siemens Aktiengesellschaft, Munich (DE)

(72) Inventors: Vivek Kulkarni, Unterhaching (DE); Florian Zeiger, Höhenkirchen-Siegertsbrunn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/057,650

(22) PCT Filed: May 8, 2019

(86) PCT No.: PCT/EP2019/061762
§ 371 (c)(1),
(2) Date: Nov. 21, 2020

(87) PCT Pub. No.: WO2019/224001
PCT Pub. Date: Nov. 28, 2019

(65) Prior Publication Data
US 2021/0203555 A1   Jul. 1, 2021

(30) Foreign Application Priority Data

May 22, 2018   (EP) ..................... 18173595

(51) Int. Cl.
*H04L 9/32* (2006.01)
*H04L 41/0859* (2022.01)
(Continued)

(52) U.S. Cl.
CPC .......... *H04L 9/3239* (2013.01); *G06F 16/211* (2019.01); *G06F 16/27* (2019.01);
(Continued)

(58) Field of Classification Search
CPC . H04L 9/14; H04L 9/30; H04L 9/3247; H04L 9/3239; H04L 63/123; H04L 67/10; G06F 16/211; G06F 16/27
See application file for complete search history.

(56) References Cited

U.S. PATENT DOCUMENTS

2018/0253452 A1* 9/2018 Callan .................. H04L 9/14

FOREIGN PATENT DOCUMENTS

| CN | 107 222 478 | 9/2017 | ............. H04L 29/06 |
| WO | 2017 220115 | 12/2017 | ............. H04L 29/08 |

OTHER PUBLICATIONS

Univ-Jinan (CN 107222478A)—PCT Search Listing.*
(Continued)

*Primary Examiner* — Kyung H Shin
(74) *Attorney, Agent, or Firm* — Slayden Grubert Beard PLLC (57) ABSTRACT

Various embodiments include an apparatus for operating a software-defined network having a number of network elements comprising: a memory unit storing an image of the software-defined network; a control unit programmed to use the stored image as a basis for controlling forwarding of data streams by the number of network elements; and a comparison unit programmed to compare the stored image against a network image published in a ledger of a blockchain.

13 Claims, 4 Drawing Sheets

(51) Int. Cl.
    *H04L 41/0893*    (2022.01)
    *H04L 41/5003*    (2022.01)
    *H04L 45/64*       (2022.01)
    *H04L 9/40*        (2022.01)
    *G06F 16/21*      (2019.01)
    *G06F 16/27*      (2019.01)
    *H04L 67/10*      (2022.01)

(52) U.S. Cl.
    CPC ...... *H04L 41/0859* (2013.01); *H04L 41/0893* (2013.01); *H04L 41/5003* (2013.01); *H04L 45/64* (2013.01); *H04L 63/123* (2013.01); *H04L 67/10* (2013.01)

(56) References Cited

OTHER PUBLICATIONS

Search Report for International Application No. PCT/EP2019/061762, 13 pages, dated Jul. 25, 2019.
Search Report for EP Application No. 18173595.2, 18 pages, dated Aug. 6, 2018.
Written Opinion for International Application No. PCT/EP2019/061762, 19 pages, dated Mar. 22, 2020.
Sharma Pradip Kumar et al: "DistBlockNet: A Distributed Blockchains-Based Secure SDN Architecture for IoT Networks", IEEE Communications Magazine, vol. 55, No. 9, pp. 78-85, 2017.

\* cited by examiner

APPARATUS, SYSTEM AND METHOD FOR OPERATING A SOFTWARE-DEFINED NETWORK

CROSS-REFERENCE TO RELATED APPLICATIONS

This application is a U.S. National Stage Application of International Application No. PCT/EP2019/061762 filed May 8, 2019, which designates the United States of America, and claims priority to EP Application No. 18173595.2 filed May 22, 2018, the contents of which are hereby incorporated by reference in their entirety.

TECHNICAL FIELD

The present disclosure relates to networks. Various embodiments include control apparatuses, systems, and/or methods for operating a software-defined network.

BACKGROUND

A typical software-defined network is formed from multiple network elements, such as for example SDN switches, that are controlled by a control apparatus, such as for example an SDN controller. The SDN switches identify data streams on a data level of the network and forward them according to data stream rules implemented in the SDN switches. The SDN controller communicates with the SDN switches on a control level of the network to implement data stream rules in the SDN switches on the basis of a network image stored in the SDN controller. Multiple virtual network areas or client network areas may be set up in the software-defined network. There is the intention of SDN-based distributed networks or wide area networks (WAN) in which multiple physical subareas are controlled by a respective SDN controller. This requires a comparison of the network image between the SDN controllers to form client network areas spanning multiple subareas.

An attacker gaining access to the network image can manipulate data streams in the network. Conventionally, the network image is therefore protected locally in a private area. This is inconsistent with the desire to compare the network image against further control apparatuses of a WAN.

SUMMARY

Against this background, the teachings of the present disclosure allow simple and secure comparison of a network image of a control apparatus of a software-defined network. For example, some embodiments of the teachings herein include a control apparatus for operating a software-defined network having a number of network elements, the control apparatus including: a memory unit designed to store a network image of the software-defined network; a control unit designed to take the stored network image as a basis for controlling forwarding of data streams by the number of network elements; and a comparison unit designed to compare the stored network image against a network image published in a ledger of a blockchain.

As another example, some embodiments include a control apparatus (1) for operating a software-defined network (2) having a number of network elements (4), wherein the control apparatus (1) has: a memory unit (5) designed to store a network image (6) of the software-defined network (2), a control unit (7) designed to take the stored network image (6) as a basis for controlling forwarding of data streams (8) by the number of network elements (4), and a comparison unit (9) designed to compare the stored network image (6) against a network image (13) published in a ledger (12) of a blockchain (11).

In some embodiments, the comparison unit (9) is designed to transmit a change to the stored network image (6) to the blockchain (11) as a change request for the published network image (13), to adopt the change to the stored network image (6) if the change request for the published network image (13) is published in the ledger (12) of the blockchain (11) as a change to the published network image, and to reject the change to the stored network image (6) if the change request for the published network image (6) is not published in the ledger (12) of the blockchain (11) as a change to the published network image (13).

In some embodiments, the comparison unit (9) is designed to adopt the change to the published network image (13) as a change to the stored network image (6) if a change request for the published network image (13) is published in the ledger (12) of the blockchain (11) as a change to the published network image (13).

In some embodiments, the comparison unit (9) comprises a blockchain node (18) of the blockchain (11), wherein the blockchain node (18) is designed to agree to a consensus to publish a change request transmitted to the blockchain (11) for the published network image (13) in the ledger (12) of the blockchain (11) if the change request for the published network image (13) is consistent with a consensus protocol of the blockchain (11).

In some embodiments, the control unit (7) is designed to receive quality of service information (21) from at least one of the number of network elements (4), wherein the consensus protocol of the blockchain (11) is based on the quality of service information (21).

In some embodiments, at least the control unit (7) is arranged in a private area and at least the blockchain node (18) is arranged in a public area.

As another example, some embodiments include a system (10) for operating a software-defined network (2) having a number of network elements (4), wherein the system (10) has: a number of control apparatuses (1, 101, 201) as claimed in one of claims 1 to 6, and multiple blockchain nodes (18) that together form the blockchain (11) and are designed: to exchange a change request transmitted to the blockchain (11) for the published network image (13) among one another; and to publish the change request in the ledger (12) of the blockchain (11) as a change to the published network image (13) only if a consensus is reached between the multiple blockchain nodes (18) in accordance with a consensus protocol of the blockchain (11).

In some embodiments, the control units (7, 107, 207) of the number of control apparatuses (1, 101, 201) are designed to control the forwarding of data streams (8) by the number of network elements (4) by communicating with the number of network elements (4) on a control level of the software-defined network (2); and the multiple blockchain nodes (18) that together form the blockchain (11) are designed to communicate with one another on a data level of the software-defined network (2) and/or via a public network.

In some embodiments, the multiple blockchain nodes (18) are designed to reach the consensus to publish the change in the ledger (12) of the blockchain (11) on the basis of evidence of a legitimate interest by a blockchain node (18) requesting the change.

In some embodiments, authorization information (19) is published in the ledger (12) of the blockchain (11), indicating those of the blockchain nodes (18) that are authorized to request changes to the published network image (13), and the evidence of the legitimate interest comprises evidence that the blockchain node (18) requesting the change is authorized to request changes to the published network image (13) in accordance with the authorization information (19) published in the ledger (12) of the blockchain (11).

In some embodiments, multiple virtual client network areas (17) defined by the published network image (13) are set up in the software-defined network (2), wherein a respective one from a number of the multiple blockchain nodes (18, 318) is respectively assigned to one of the virtual client network areas (17, 317).

In some embodiments, a respective one of the control apparatuses (1, 101, 201) is designed to control a physical subarea (102, 202) of the software-defined network (2), wherein a respective physical subarea (102, 202) is formed by a disjunct selection from the number of network elements (4), wherein a respective one from a number of the multiple blockchain nodes (18, 118, 218) is respectively assigned to one of the physical subareas (102, 202).

In some embodiments, the evidence of a legitimate interest comprises: evidence that the requesting blockchain node (18, 118, 218, 318) is assigned to one of the virtual client network areas (17, 317) and/or to one of the physical subareas (102, 202), and evidence of a quality of service of the virtual client network area (17, 317) and/or of the physical subarea (102, 202) to which the requesting blockchain node (18, 118, 218, 318) is assigned.

In some embodiments, the control unit (7, 107, 207) of a respective one of the multiple control apparatuses (1, 101, 201) is designed to receive quality of service information concerning the quality of service of a number of further instances of the physical subareas (101, 202) from at least one from the disjunct selection of network elements (4) of the physical subarea (102, 202) controlled by the control apparatus (1, 101, 201); the memory unit (5, 100, 205) of a respective one of the multiple control apparatuses (1, 101, 201) is designed to store a time characteristic of the quality of service information (21, 121, 221) received by the control unit (5, 105, 205) for each of the number of further physical subareas (102, 202); and the evidence of the quality of service of the physical subarea (102, 202) to which the requesting blockchain node (18, 118, 218) is assigned is based on the time characteristic of the quality of service information (21, 121, 221) concerning the physical subarea (102, 202) that is stored in the memory unit (5, 105, 205) of a respective one of the multiple control apparatuses (1, 101, 201).

As another example, some embodiments include a method for operating a software-defined network (2) having a number of network elements (4), wherein the method comprises: storing (S1) a network image (6) of the software-defined network (2) in a memory unit (5) of a control apparatus (1), controlling (S2), by means of a control unit (7) of the control apparatus (1), forwarding of data streams (8) by the number of network elements (4) on the basis of the stored network image (6), and comparing (S3) the network image (6) stored in the memory unit (5) of the control apparatus (1) against a network image (13) published in a ledger (12) of a blockchain (11).

As another example, some embodiments include a computer program product that prompts the performance of the various methods as described herein on a program-controlled device.

BRIEF DESCRIPTION OF THE DRAWINGS

Further refinements and embodiments of the teachings herein are the subject matter of the claims and of the embodiments described herein. The teachings are explained in more detail below on the basis of example embodiments with reference to the accompanying figures, in which:

DETAILED DESCRIPTION

In some embodiments, the control device compares the network image stored in the control apparatus with a published network image and can therefore protect said network image from local manipulations. The published network image is published in a blockchain and can therefore be protected from public manipulations by a consensus protocol of the blockchain. In some embodiments, the network image published in the blockchain allows simple comparison of the network image of the control apparatus against a network image of a further control apparatus.

A software-defined network means a virtualizable network in which a number of virtual network areas are able to be set up. A virtual network area is also referred to as a client network area. A respective client network area may be protected against influencing by a further client network area. The software-defined network can therefore also be referred to as a client-compatible network.

"Software-defined" means that functionality of the network formed from the network elements is not firmly stipulated on a respective network element. In particular, the functionality of a respective network element can be controlled by the control apparatus as a result of the control unit of the control apparatus taking the network image stored in the memory unit as a basis for implementing a respective number of data stream rules in a respective one of the network elements.

Thus, a respective one of the number of network elements can be referred to in particular as a software-definable network element. A respective network element has multiple connections and is designed to handle a data stream incoming on one of the connections in accordance with the data stream rules implemented in the network element by software. The handling can comprise for example forwarding to a further one of the connections. The forwarding can also comprise parameterization. Parameterization is intended to be understood to mean for example implementing a traffic parameter such as for example a bandwidth limitation. The handling can also comprise rejecting and/or performing a virtual network function.

A data stream is for example a data stream in accordance with RFC 2722, RFC 3697, and/or RFC 3917. A data stream can be regarded for example as a number of packets transported from a starting endpoint to a destination endpoint within a defined period by using a defined protocol. A starting endpoint or destination endpoint of the data stream may be for example a defined port or service of a network terminal.

By way of example, a respective network element can use traffic properties, such as for example the defined protocol, the starting and/or destination endpoint, etc., of a packet incoming on a data level of the network to identify an associated one of the data stream rules implemented in the network element and to handle, such as for example forward and parameterize, the packet as part of a data stream in accordance with the identified one of the data stream rules. If no data stream rule associated with the incoming packet is identified, the network element can transmit the traffic properties of the incoming packet to the control apparatus via a control level of the software-defined network. The control apparatus may be designed to react to traffic properties transmitted by a network element by taking the network image stored in the memory unit as a basis for calculating an associated data stream rule and setting up a new data stream by implementing the calculated data stream rule in a number of network elements of the network along which the data stream can be routed. In this way, the control unit of the control apparatus can control the forwarding of data streams by the number of network elements.

A respective network image can comprise in particular information about the physical configuration of the software-defined network. Examples of information about the physical configuration are a physical topology, which can comprise network terminals, network elements and connecting links therebetween and can define the respective properties thereof. Furthermore, the network image can comprise information about a virtual configuration of a number of virtual client network areas, such as for example a virtual topology of a respective client network area, and also definitions of endpoints, services, traffic parameters such as assured bandwidths, bandwidth restrictions, etc.

Functionality for the handling and/or forwarding of data streams by the network elements may therefore be implemented in the software-defined network. This functionality is also referred to as data level. Functionality for controlling the handling and/or forwarding of the data streams, for defining client network areas and the like may be implemented by the control apparatus. This functionality is also referred to as "control level" below. A clear separation between data level and control level allows the software-defined network to be controlled centrally and to be quickly adapted to changing circumstances.

In some embodiments, a respective network element may be an SDN network element, an SDN route and/or an SDN switch, and the control apparatus may be an SDN controller.

A blockchain can be described as a distributed, public, transactional, manipulation-protected, consensus-based database. "Distributed" means that the blockchain is formed by a plurality of disjunct blockchain nodes. "Public" means that the blockchain nodes may be under the control of different players, such as for example different clients of the network or different operators of different networks or physical network areas. "Transactional" means that data are storable in the blockchain as a sequence of transactions. The sequence of all transactions stored in the blockchain can be referred to as the "ledger" of the blockchain. "Manipulation-protected" means that subsequent changes to the ledger of the blockchain are not possible or are possible only in the event of a consensus between a plurality of the blockchain nodes. "Consensus-based" means the inclusion of a further transaction in the ledger requires a consensus between a plurality of the blockchain nodes.

A blockchain may be embodied as follows: the ledger of the blockchain comprises a chain of successive blocks. A respective block comprises at least one of the transactions stored in the ledger, which are also referred to as "confirmed transactions". A respective block comprises a hash value for all of the confirmed transactions of the block. The hash value for all of the confirmed transactions can be for example a hash value from a Merkle tree of hash values for a respective transaction of the block. A respective block also comprises a reference value, which is a hash value for the preceding block of the chain, for example. In this way, the ledger may be in the form of a hash-value-based chain of blocks. A manipulation on a transaction of the ledger can lead to invalidation of the hash values for the block comprising the manipulated transaction and hence also to invalidation of all hash values for all subsequent blocks.

In some embodiments, a respective blockchain node stores one or more local copies of the ledger. A longest one of the local copies of the ledger can be handled as a valid copy of the ledger, that is to say as the ledger, by the blockchain node.

In some embodiments, a blockchain may also be embodied as follows: the blockchain nodes exchange an unconfirmed transaction intended to be added to the ledger among one another. The exchange can be effected in a peer-to-peer manner, a respective blockchain node being connected to at least one further one, but not necessarily to all, of the blockchain nodes. A respective blockchain node can form an unconfirmed block, which can have an identical structure to a confirmed block, from the exchanged transactions that reach it. The blockchain nodes exchange unconfirmed blocks among one another in the same way as the unconfirmed transactions. A respective blockchain node incorporates one of the exchanged unconfirmed blockchain nodes that reaches it into the local copy, or into one of the multiple local copies, of the ledger only if the unconfirmed block and a respective one of the unconfirmed transactions of the block are consistent with a consensus protocol of the blockchain.

The consensus protocol of the blockchain can at least prescribe that the reference value of the unconfirmed block is the hash value of the last block of the local copy of the ledger. In this way, it is possible to ensure that unconfirmed blocks are incorporated into the ledger only if their originator is a blockchain node that has knowledge of the entire, unmanipulated ledger. The consensus protocol can also prescribe that the sequence of transactions of the unconfirmed block is represented by valid state transitions of a state described by the ledger. Further criteria that the consensus protocol can prescribe, such as for example a proof of stake, are described more thoroughly below.

In some embodiments, a consensus between the blockchain nodes can arise as a result of a plurality of the blockchain nodes adopting the unconfirmed block in the ledger as a confirmed block. A malicious blockchain node operating in accordance with a modified consensus protocol and/or using a modified ledger can lose the ability to participate in establishing a consensus or to change the state of the ledger, since blocks transmitted by said malicious blockchain node can be rejected by the other blockchain nodes.

Any change to the state of the ledger or of the data stored in the ledger is therefore subject to an inspection by a plurality of blockchain nodes. In this way, a high level of protection against manipulation of the ledger can be ensured by means of automated establishment of a consensus.

The network image published in the ledger of the blockchain may be stored in the ledger of the blockchain as payload of one or more transactions. Thus, the published network image can also be regarded as a sequence of change transactions or changes published in the ledger that, when performed in succession, result in a current state of the published network image.

Comparison of the network image stored in the memory unit of the control apparatus against the network image published in the ledger of the blockchain is intended to be understood to mean in particular that changes to one of the network images are adopted in the respective other network image, so that the stored network image and the published network image are held in sync.

The ledger of the blockchain may be accessible to the comparison unit of the control apparatus for example by virtue of the comparison unit comprising one of the blockchain nodes and/or by virtue of the comparison unit being communicatively connected to at least one of the blockchain nodes.

The blockchain may be a private blockchain of an operator of the control apparatus, a blockchain of a consortium comprising multiple operators of multiple control apparatuses or a public blockchain. In particular, the exchange of transactions and blocks by the blockchain nodes can be effected in the data level of the software-defined network. The ledger of the blockchain may therefore be stored in the data level of the software-defined network. This advantageously allows the comparison of the published network image for example against further control apparatuses to be simplified. At the same time, the consensus protocol of the blockchain advantageously allows the published network image to be protected from manipulations.

In some embodiments, the comparison unit is designed to transmit a change to the stored network image to the blockchain as a change request for the published network image; to adopt the change to the stored network image if the change request for the published network image is published in the ledger of the blockchain as a change to the published network image; and to reject the change to the stored network image if the change request for the published network image is not published in the ledger of the blockchain as a change to the published network image.

In some embodiments, the network image stored in the control apparatus can be protected against local manipulations. In particular, the network image stored in the control apparatus can be successfully changed only if a consensus is reached between the blockchain nodes of the blockchain. It can therefore be stated that changes to the network image of the control apparatus are subject to a peer review by multiple players, such as for example clients of the software-defined network or operators of further control apparatuses.

A "change" to a respective network image is a transaction that converts the network image before the change into the network image after the change, and/or as data designed to change the network image when applied to the network image.

A "change request" is an as yet unconfirmed change and thus as an unconfirmed transaction (unconfirmed change transaction).

The "transmission of the change to the stored network image to the blockchain as a change request for the published network image" can be effected in particular by virtue of a blockchain node of the blockchain that the comparison unit of the control apparatus comprises or that is communicatively coupled to the comparison unit of the control apparatus forming an unconfirmed block with the change request as an unconfirmed transaction and transmitting the unconfirmed block to at least one further blockchain node of the blockchain.

"Publication of the change request in the ledger of the blockchain as a change to the published network image" means that a consensus is reached between multiple instances of the blockchain nodes and the change transaction is adopted in the ledger by a respective blockchain node as a confirmed transaction.

"Adoption of the change to the stored network image" means that the change is applied to the stored network image and from this time onward the control unit of the control apparatus controls the forwarding of data streams in the software-defined network by the number of network elements on the basis of the changed stored network image.

The control apparatus (control unit, memory unit and/or comparison unit) can query the blockchain (a blockchain node that the comparison unit comprises or that is communicatively connected to the comparison unit) at regular intervals in order to discover whether a respective change request transmitted to the blockchain for the published network image has been published, or it can be notified by the blockchain node in the event of publication of the change request.

"Rejection of the change to the stored network image" means that the change is not applied to the network image stored in the memory unit and/or the change is reversed if it has already been applied to the network image stored in the memory unit, and the control unit of the control apparatus continues to control the forwarding of data streams in the software-defined network by the number of network elements on the basis of the unchanged network image stored in the memory unit.

In some embodiments, the comparison unit is designed to adopt the change to the published network image as a change to the stored network image if a change request for the published network image is published in the ledger of the blockchain as a change to the published network image.

In some embodiments, the network image stored in the memory unit maybe compared against a further control apparatus. If for example the network image of the further control apparatus is changed and an associated change request for the published network image is published in the ledger of the blockchain, then the network image stored in the memory unit is likewise changed accordingly. It is also advantageously possible for a control apparatus to be provided at a remote location, for example, and to be remotely configurable by an operator of the software-defined network by publishing change requests in the ledger of the blockchain.

It is therefore possible to provide a simple way of comparing or changing the network image stored in the memory unit. Although data transmissions on a data level of the software-defined network and/or in a public network can be used for the comparison, the consensus protocol of the blockchain can ensure that only legitimate change requests are published in the ledger of the blockchain. It is thus possible for the network image stored in the memory unit of the control apparatus to be protected from manipulations by malicious third parties by the consensus protocol of the blockchain.

In some embodiments, the comparison unit comprises a blockchain node of the blockchain. The blockchain node is designed to agree to a consensus for publication of a change request transmitted to the blockchain for the published network image in the ledger of the blockchain if the change request for the published network image is consistent with a consensus protocol of the blockchain.

In some embodiments, it is possible to eliminate the need for specially protected communication between the control apparatus and a blockchain node external to the control apparatus. The comparison unit of the control apparatus can participate in the blockchain directly. Furthermore, the control apparatus can be involved in the establishment of a consensus by the blockchain nodes of the blockchain about the publication of change requests for the published network image.

In some embodiments, the control unit is designed to receive quality of service information from at least one of the number of network elements, wherein the consensus protocol of the blockchain is based on the quality of service information. Quality of service information means information describing a quality of operation of an entity connected to a respective network element or of a network service provided by said entity. The entity can be for example a network terminal, a further network element and/or a further control apparatus. The quality of service information can be for example information about availability (uptime/downtime), traffic volume, packet loss frequencies, average bandwidth, response speed and the like for the entity or the network service and/or can be a quality of service parameter derived from such information.

Expressed another way, the control apparatus can obtain information about the network operation performed by the network elements from the network elements. On the basis of this information, the control apparatus can assess the quality of the network operation of the software-defined network, individual client areas and/or endpoints thereof and/or the quality of the operation of an adjacent software-defined network.

That the "consensus protocol of the blockchain is based on the quality of service information" can mean that a change to the published network image is possible only if a quality-of-service-based condition is satisfied. A consensus about the publication of a change to the published network image can, in particular, be reached only if the quality-of-service-based condition is satisfied.

By way of example, the blockchain node of the comparison unit of the control apparatus can agree to the consensus only if the quality of service information received by the control unit reveals that the change request comes from a further blockchain node that is part of an entity (network terminal, further network element, further control apparatus) that provides an adequate quality of service and/or is arranged in a client network area of the software-based network that provides an adequate quality of service and/or in a further software-defined network that provides an adequate quality of service in comparison with the software-defined network controlled by the control apparatus.

"An adequate quality of service" means that a quality of service parameter derived from the quality of service information is greater than a predetermined threshold value. The quality of service parameter can describe the current quality of service and/or a mean value of a quality of service detected over a predetermined period.

As a result of the establishment of a consensus being able to be dependent on a provided quality of service, it is possible for a proof of stake to be implemented. The "proof of stake" can involve changes to the published network image being able to be successfully requested only by blockchain nodes that are in the area of responsibility of a player, such as an operator of a further software-defined network or of a client of the software-defined network, that has gained credibility as a result of a network element, a control apparatus, a client network area or a further software-defined network under its area of responsibility providing or having provided services of adequate quality for the software-defined network.

In some embodiments, at least the control unit is arranged in a private area and at least the blockchain node is arranged in a public area. In some embodiments, the memory unit is also arranged in the private area.

In some embodiments, the private area is a physical or virtual network area that for example is protected against network access by endpoints in the client network areas of the software-defined network and/or by endpoints in further software-defined networks and/or by blockchain nodes of the blockchain and/or by uninvolved third parties.

In some embodiments, the public area is a physical or virtual network area that is accessible at least to a further blockchain node of the blockchain. Accordingly, functionality for the comparison of the stored network image against the published network image is exposed to network access by an external entity, such as the further blockchain node. At the same time, functionality of the control apparatus for controlling the software-defined network and/or the stored network image is protected from manipulations by means of external network access.

In some embodiments, there is a system for operating a software-defined network having a number of network elements. The system has: a number of control apparatuses as described above, multiple blockchain nodes that together form the blockchain and are designed to exchange a change request transmitted to the blockchain for the published network image among one another; and to publish the change request in the ledger of the blockchain as a change to the published network image only if a consensus is reached between the multiple blockchain nodes in accordance with a consensus protocol of the blockchain.

A respective one of the control apparatuses may be designed to control a respective disjunct selection from the number of network elements. The embodiments and features described for the proposed control apparatuses apply to the proposed systems, as well.

In some embodiments, the control units of the number of control apparatuses control the forwarding of data streams by the number of network elements by communicating with the number of network elements on a control level of the software-defined network. The multiple blockchain nodes that together form the blockchain are designed to communicate with one another on a data level of the software-defined network and/or via a public network.

The control level of the software-defined network may be reserved for the communication by the number of control apparatuses with the number of network elements. The communication for controlling the network operation may therefore be protected against external influencing and manipulation.

By contrast, the data level of the software-defined network can be jointly used for data flows of the software-defined network and for the communication between the blockchain nodes. Expressed another way, the blockchain may be formed in the data level of the software-defined network and/or in a public network. This allows comparison of the network image between the number of control apparatuses, with the blockchain ensuring protection against manipulation.

A public network comprises a network that is different than the software-defined network. "Public" can mean for example that the public network is accessible for data transmissions by more than one player, for example an operator or client.

In some embodiments, the multiple blockchain nodes are designed to reach the consensus to publish the change in the ledger of the blockchain on the basis of evidence of a legitimate interest by a blockchain node requesting the change. Changes to the published network image by unauthorized players can therefore advantageously be prevented.

The evidence of the legitimate interest can comprise for example a proof of identity and/or a proof of work and/or a proof of stake.

The "blockchain node requesting the change" means that one of the blockchain nodes that has created the change request for the published network image. The requesting blockchain node can be identified for example on the basis of a digital signature that the change request comprises.

The "authorized interest" can relate to the blockchain node itself and/or to an entity, such as a network terminal, one of the network elements and/or one of the control apparatuses that comprise the requesting blockchain node, and/or to an operator of such an entity.

In some embodiments, authorization information is published in the ledger of the blockchain, indicating those of the blockchain nodes that are authorized to request changes to the published network image. The evidence of the legitimate interest comprises evidence that the blockchain node requesting the change is authorized to request changes to the published network image in accordance with the authorization information published in the ledger of the blockchain. It is therefore possible to continue to increase the protection against manipulation for the published network image and the stored network images by virtue of only such blockchain nodes as have previously been granted an explicit authorization being able to change the published network image.

The authorization information may be published in the ledger of the blockchain as payload of transactions in a similar manner to the published network image. By way of example, the authorization information can comprise a public digital key of the blockchain nodes authorized to request and/or a certificate from a certificate authority (CA). The evidence of the legitimate interest can comprise a digital signature of the requesting blockchain node that is verifiable on the basis of the public digital key and/or the certificate.

In some embodiments, multiple virtual client network areas defined by the published network image are set up in the software-defined network. A respective one from a number of the multiple blockchain nodes is respectively assigned to one of the virtual client network areas.

A blockchain node "assigned to one of the virtual client network areas" means that the blockchain node forms an endpoint in the virtual client network area and/or that the blockchain node is demonstrably operated by the client to which the virtual client network area is assigned. Clients of the virtual client network area that have a legitimate interest in smooth operation of the software-defined network can therefore participate in the consensus protocol of the blockchain. In some embodiments, the clients decide in the general consensus about the published network image and hence about the configuration of the software-defined network. In this instance "decide" means an automated decision made by the blockchain nodes on the basis of the consensus protocol.

In some embodiments, a respective one of the control apparatuses controls a physical subarea of the software-defined network. A respective physical subarea is formed by a disjunct selection from the number of network elements. A respective one from a number of the multiple blockchain nodes is respectively assigned to one of the physical subareas. In some embodiments, a respective one of the control apparatuses can be operated by a respective different operator.

Thus, the software-defined network can also be regarded as an interconnection comprising multiple software-defined networks and a respective physical subarea can also be regarded as a respective software-defined network.

A blockchain node "assigned to one of the physical subareas" means that the blockchain node forms an endpoint in the physical subarea and/or that the blockchain node is operated by the operator of the control apparatus controlling the physical subarea. A respective blockchain node assigned to a physical subarea can preferably be in the form of part of that control apparatus that controls the respective physical subarea.

The operators of the control apparatuses that compare their network images over the blockchain can therefore participate in the consensus protocol of the blockchain. In some embodiments, the operators decide in the general consensus about the published network image and hence about the configuration of the software-defined network. In this instance "decide" means an automated decision made by the blockchain nodes on the basis of the consensus protocol.

In some embodiments, the evidence of a legitimate interest comprises: evidence that the requesting blockchain node is assigned to one of the virtual client network areas and/or to one of the physical subareas, and evidence of a quality of service of the virtual client network area and/or of the physical subarea to which the requesting blockchain node is assigned. Changes to the published network image can therefore be successfully requested only by blockchain nodes that have gained credibility as a result of their assigned virtual client network area and/or physical subarea providing services of an adequate quality.

The evidence that the requesting blockchain node is assigned to one of the virtual client network areas and/or to one of the physical subareas can be provided by means of a digital signature, for example. In some embodiments, an association of the requesting blockchain node with a client network area and/or with a physical network area may be determined on the basis of a data stream by means of which the requesting blockchain node transmits the change request.

The evidence of a quality of service can be provided in particular by virtue of a respective blockchain node involved in the consensus requesting from a respective control apparatus a confirmation of whether the virtual client network area and/or the physical subarea to which the requesting blockchain node is assigned provides a quality of service that is higher than a predetermined threshold value.

In some embodiments, the control unit of a respective one of the multiple control apparatuses receives quality of service information concerning the quality of service of a number of further instances of the physical subareas from at least one from the disjunct selection of network elements of the physical subarea controlled by the control apparatus. The memory unit of a respective one of the multiple control apparatuses is designed to store a time characteristic of the quality of service information received by the control unit for each of the number of further physical subareas. The evidence of the quality of service of the physical subarea to which the requesting blockchain node is assigned is based on the time characteristic of the quality of service information concerning the physical subarea that is stored in the memory unit of a respective one of the multiple control apparatuses.

The at least one of the network elements of the physical subarea controlled by a respective one of the control apparatuses may be a network element that forms a transfer point to a network element of an adjacent physical subarea. The at least one of the network elements can therefore have quality of service information about a quality of services and/or of the operation of the adjacent physical subarea. A respective control apparatus of a physical subarea may therefore have historical quality of service information available about adjacent instances of the physical subareas.

It is therefore possible to form a blockchain in the case of which a respective blockchain node is assigned to or comprised by a respective one of the control apparatuses, for example, and a change to the published virtual network image jointly used by the multiple control apparatuses is possible only in the event of a consensus between the blockchain nodes of the multiple control apparatuses. The consensus can be based in particular on a control apparatus that requests the change (control apparatus assigned to the blockchain node that requests the change) consistently providing services of adequate quality over a predetermined historical period. This allows a proof of stake to be provided.

A control apparatus that is newly added to the system can in particular initially be denied changing the published network image. If the physical subarea controlled by the control apparatus is consistently operated with an adequate quality of service over a predetermined period, the control apparatus can gain credibility and, after some time, attain the opportunity to change the published network image.

It is therefore advantageously possible to bring about an automated consensus about a control apparatus operated with adequate credibility being granted the authorization to change the published network image.

The respective unit of a respective control apparatus, for example control unit, memory unit and/or comparison unit, may be implemented in hardware and/or else in software. In the case of a hardware implementation, the respective unit may be in the form of an apparatus or in the form of part of an apparatus, for example in the form of a computer or in the form of a microprocessor or in the form of a control computer of a vehicle. In the case of a software implementation, the respective unit may be in the form of a computer program product, in the form of a function, in the form of a routine, in the form of part of a program code or in the form of an executable object.

In some embodiments, a method for operating a software-defined network having a number of network elements comprises: storing a network image of the software-defined network in a memory unit of a control apparatus; controlling, by means of a control unit of the control apparatus, forwarding of data streams by the number of network elements on the basis of the stored network image; and comparing the network image stored in the memory unit of the control apparatus against a network image published in a ledger of a blockchain. The embodiments and features described for the proposed control apparatuses and/or the proposed systems apply to the proposed methods accordingly. In some embodiments, a computer program product prompts the performance of the method as explained above on a program-controlled device.

A computer program product, such as e.g. a computer program means, can be provided or supplied for example as a storage medium, such as e.g. a memory card, USB stick, CD-ROM, DVD, or else in the form of a downloadable file from a server in a network. This can be effected for example in a wireless communication network by means of the transmission of an appropriate file having the computer program product or the computer program means.

Further possible implementations of the teachings herein comprise combinations, which are also not explicitly cited, of features or embodiments described above or below for the exemplary embodiments. In this case, a person skilled in the art will also add individual aspects to the respective basic forms as improvements or additions.

Figure 1:
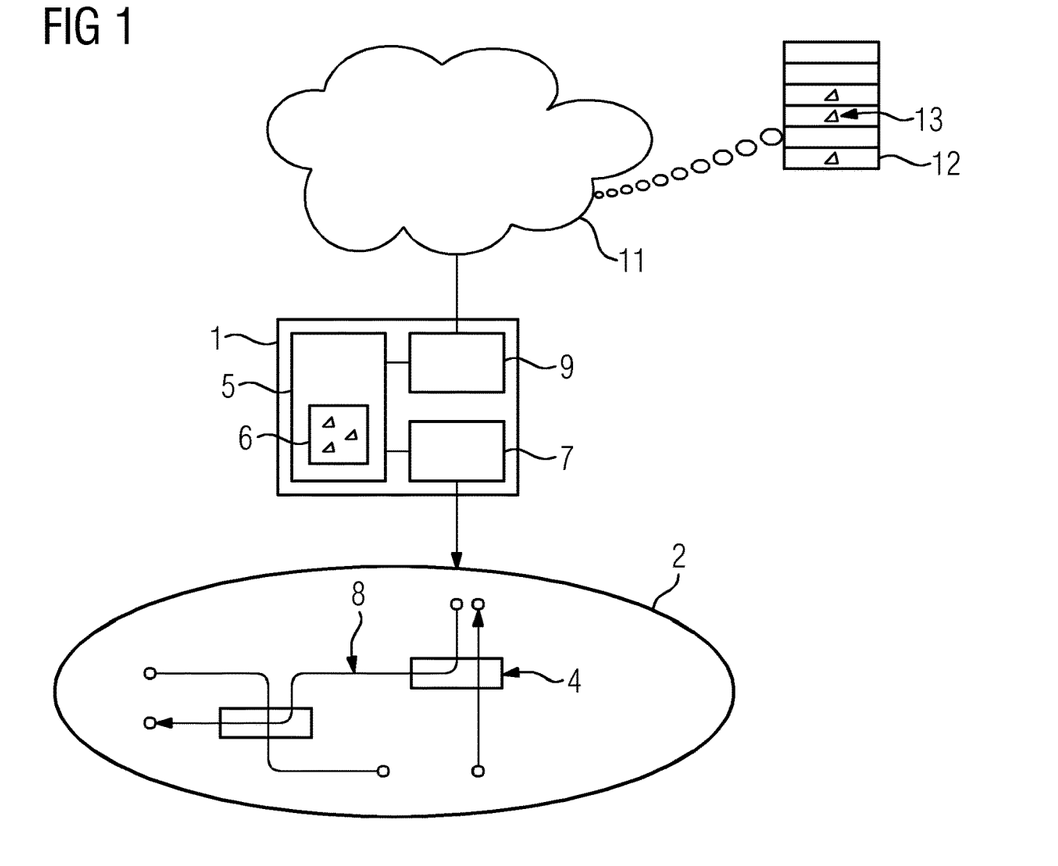
FIG. 1 shows a control apparatus, a software-defined network and a blockchain according to a first exemplary embodiment of the teachings herein.

In the figures, identical or functionally identical elements have been provided with the same reference signs, unless indicated otherwise. FIG. 1 shows a control apparatus 1, a software-defined network 2 and a blockchain 11 according to a first exemplary embodiment. The control apparatus 1 comprises a memory unit 5, a control unit 7 and a comparison unit 9. The memory unit 5 stores a network image 6 of the software-defined network 2. The software-defined network 2 comprises two network elements 4, which are designed to forward data streams 8 within the software-defined network 2.

FIG. 1 additionally shows a blockchain 11, which is illustrated as a cloud. It goes without saying that the blockchain 11 may be set up by a multiplicity of blockchain nodes (not shown). FIG. 1 additionally illustrates a ledger 12 of the blockchain 11. The ledger 12 stores a published network image 13. The published network image is illustrated as a sequence of multiple changes or change transactions 13.

Figure 2:
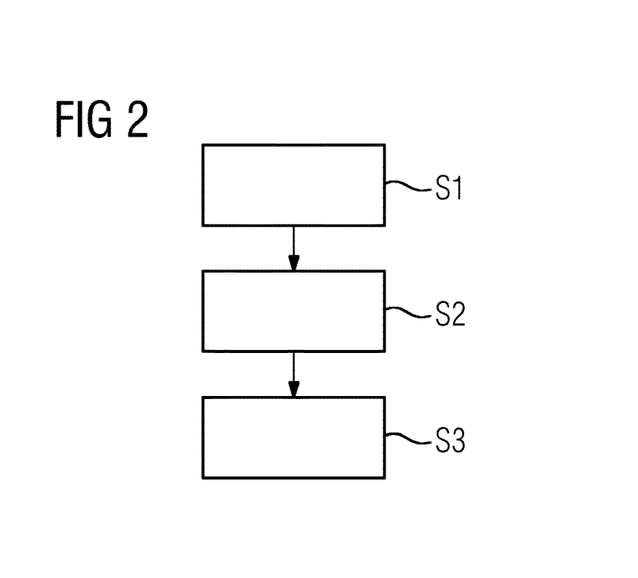
FIG. 2 shows a method for operating a software-defined network using the first exemplary embodiment.

FIG. 2 shows a method for operating the software-defined network 2. Reference is made to FIG. 1 and FIG. 2 jointly. In step S1, the network image 6 of the software-defined network 2 is stored in the memory unit 5. In step S2, the forwarding of data streams 8 by the network elements 4 is controlled by the control unit 7 on the basis of the network image 6.

In some embodiments, a network element 4 reports traffic parameters of an unidentified data packet (not shown) to the control unit 7. The control unit 7 takes the network image 6 stored in the memory unit 5 as a basis for determining a data stream rule for each of the two network elements 4 and implements the data stream rule on the two network elements 4. This sets up a data stream 8. If further packets containing the same traffic parameters arrive at the network element 4, these can be identified on the basis of the implemented data stream rule as being associated with the data stream 8 and, according to the data stream rules, forwarded to the further network element 4 and/or an endpoint (indicated by circles) and possibly parameterized, without this requiring a further communication with the control unit 7.

In step S3, the network image 6 stored in the memory unit 5 is compared against the network image 13 published in the ledger 12 of the blockchain 11. In some embodiments, comparison can involve a change published in the ledger 12 to the published network image 13 being adopted in the stored network image 6 and/or a change to the stored network image 6 can be published in the ledger 12 as a change to the published network image 13.

In some embodiments, the comparison unit 7 may be designed not to adopt a change (to prevent and/or reverse adoption of said change) that is supposed to be made to the network image 6 but whose publication is denied by the blockchain 11 on the basis of the consensus protocol of the blockchain 11 in the stored network image 6.

Figure 3:
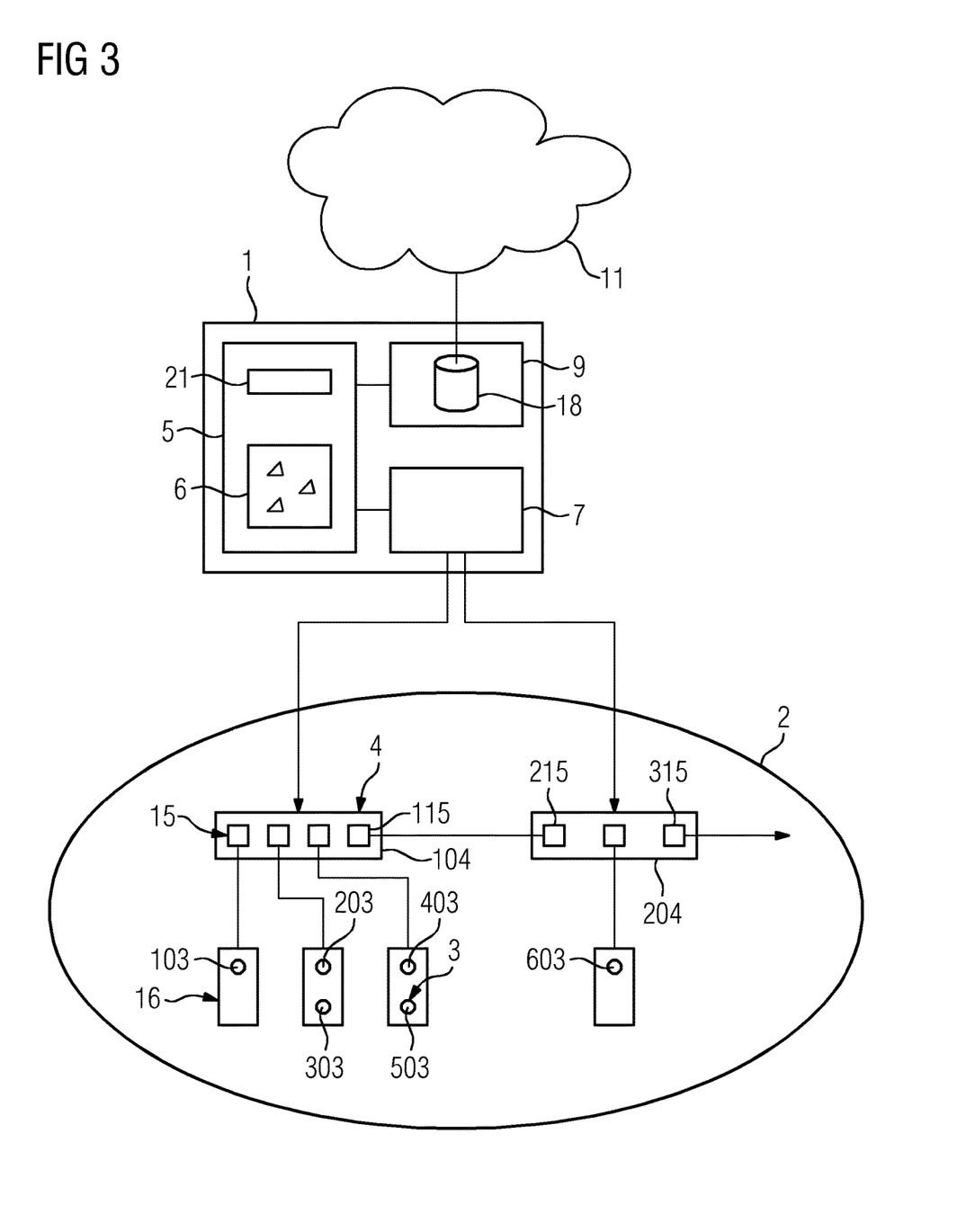
FIG. 3 shows a development of the control apparatus from FIG. 1 and a physical view of the software-defined network.

FIG. 3 shows a development of the control apparatus 1 from FIG. 1 and a physical view of the software-defined network 2. The software-defined network 2 is formed on the physical level from two network elements 4. A respective one of the network elements 4 has a respective number of connections 15. Multiple terminals 16 are connected to one each of the connections 15 of one of the network elements 4. In each case at least one endpoint 3 is formed on a respective one of the terminals 16.

Some of the connections of the network elements 4 are not connected to a terminal 16. As such, the connection 115 of the network element 104 is connected to the connection 215 of the network element 204. The connection 315 of the network element 204 is a transfer point to an external network and/or to a further software-defined network (not shown). In a conventional physical network designed in an analogous manner to that shown in FIG. 3, it would be possible, provided that the network elements 4 were conventional switches, for each of the endpoints 3 to communicate with each of the endpoints 3, which might result in respective instances of the data streams being impaired.

However, the control unit 7 of the control device 1 takes the network image 6 as a basis for implementing virtual client network areas (17 in FIG. 4) in the software-defined network 2 by implementing respective data stream rule sets in a respective network element 4 (this is indicated by arrows in FIG. 3). The network elements 4 are designed to forward and parameterize data streams (8 in FIG. 1) in the software-defined network 2 on the basis of the data stream rule sets implemented in each of the network elements 4.

Figure 4:
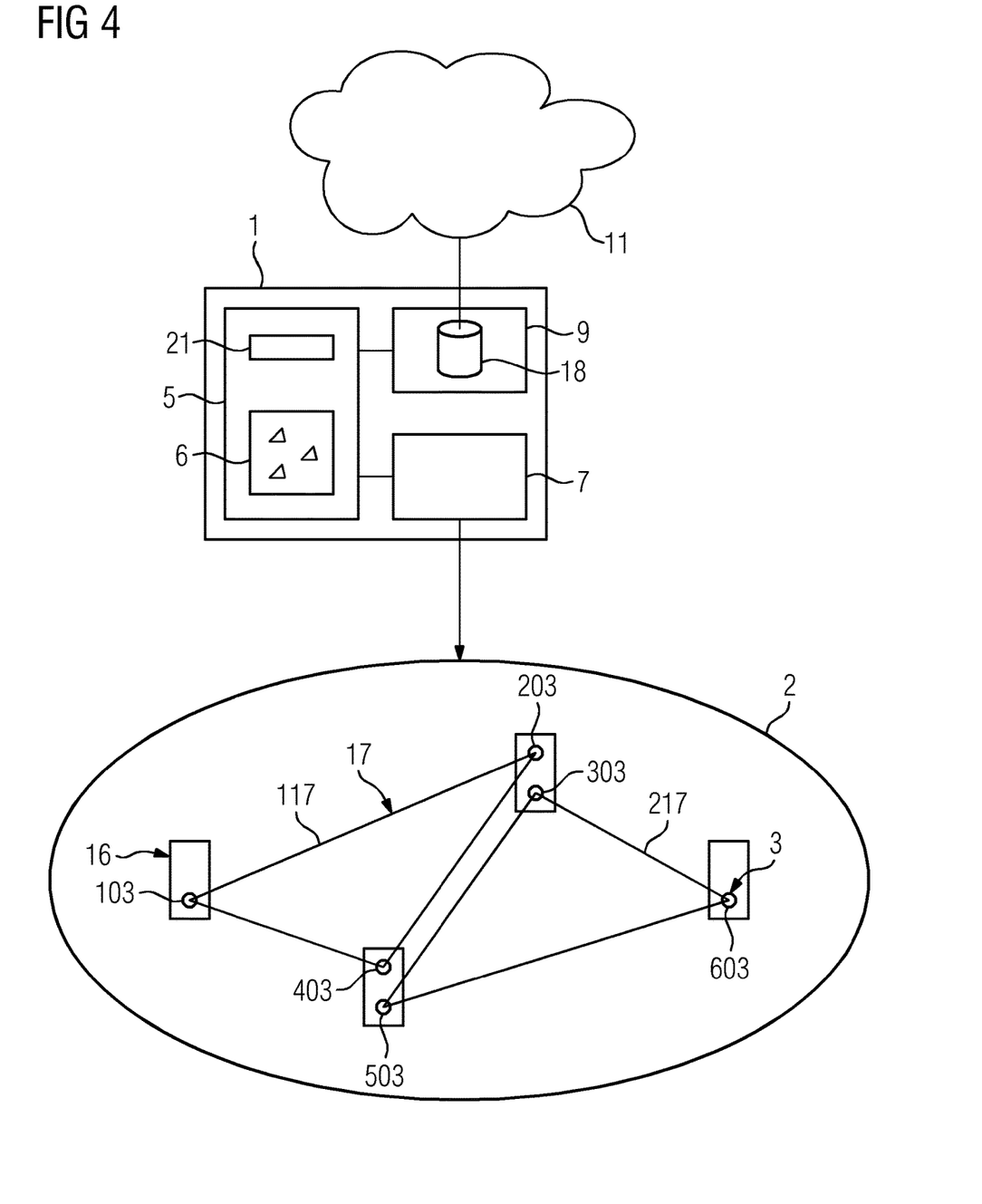
FIG. 4 shows the development of the control apparatus from FIG. 3 and a virtual view of the software-defined network.

FIG. 4 shows the development of the control apparatus 1 from FIG. 1 and a virtual view of the software-defined network 2. As shown in FIG. 4, a first virtual client network area 17, 117 is formed from the endpoints 103, 203 and 403. A second virtual client network area 17, 217 is formed from the endpoints 303, 503 and 603. The data stream rules implemented in the network elements 4 (FIG. 3) cause the virtual client network areas 17, 117, 217 to behave as completely separate physical network areas toward their respective endpoints 3. Expressed another way, the network elements 4 can use suitable parameterization, such as for example bandwidth limitation, firewalling and the like, to prevent data streams (8 in FIG. 1) of one of the virtual client network areas 117 from impairing data streams of a second of the virtual client network areas 217.

In some embodiments, the network image 6 stored in the memory unit 5 of the control apparatus 1, which network image is taken as a basis for controlling the forwarding and parameterization of the data streams (8 in FIG. 1) by the network elements 4 in the software-defined network 2, is particularly sensitive information that requires protection from manipulations. The control device 1 realizes the protection against manipulation for the stored network image 6 by comparing the stored network image 6, as described above, against a network image 13 (FIG. 1) published in a ledger 12 (FIG. 1) of the blockchain 11.

The development of the control device 1 that is shown in FIGS. 3 and 4 also differs from the control device 1 shown in FIG. 1 as follows: The control unit 7 obtains quality of service information from the respective network elements 4. By way of example, the control unit 7 obtains quality of service information about a quality of service of a further software-defined network (not shown), for which the connection 315 forms a transfer point, from the network element 204. The control unit 7 stores the obtained quality of service information in the memory unit 5 as stored quality of service information 21.

The comparison unit 9 comprises a blockchain node 18 of the blockchain 11. The blockchain node 18 forms the blockchain 11 together with further blockchain nodes (not shown). In particular, the blockchain node 18 participates in the establishment of a consensus according to a consensus protocol of the blockchain 11. If a further blockchain node (not shown) of a further control apparatus (not shown) requests a change to the published network image (13 in FIG. 1), then the blockchain node 18 agrees to the consensus to publish the change only if the quality of service information 21 reveals that the further control apparatus operates the further software-defined network with a quality of service that is higher than a predetermined threshold value. It is therefore possible for only control apparatuses 1 that operate a respective software-defined network 2 with adequate quality of service to successfully request changes to the published network image (13 in FIG. 1).

Figure 5:
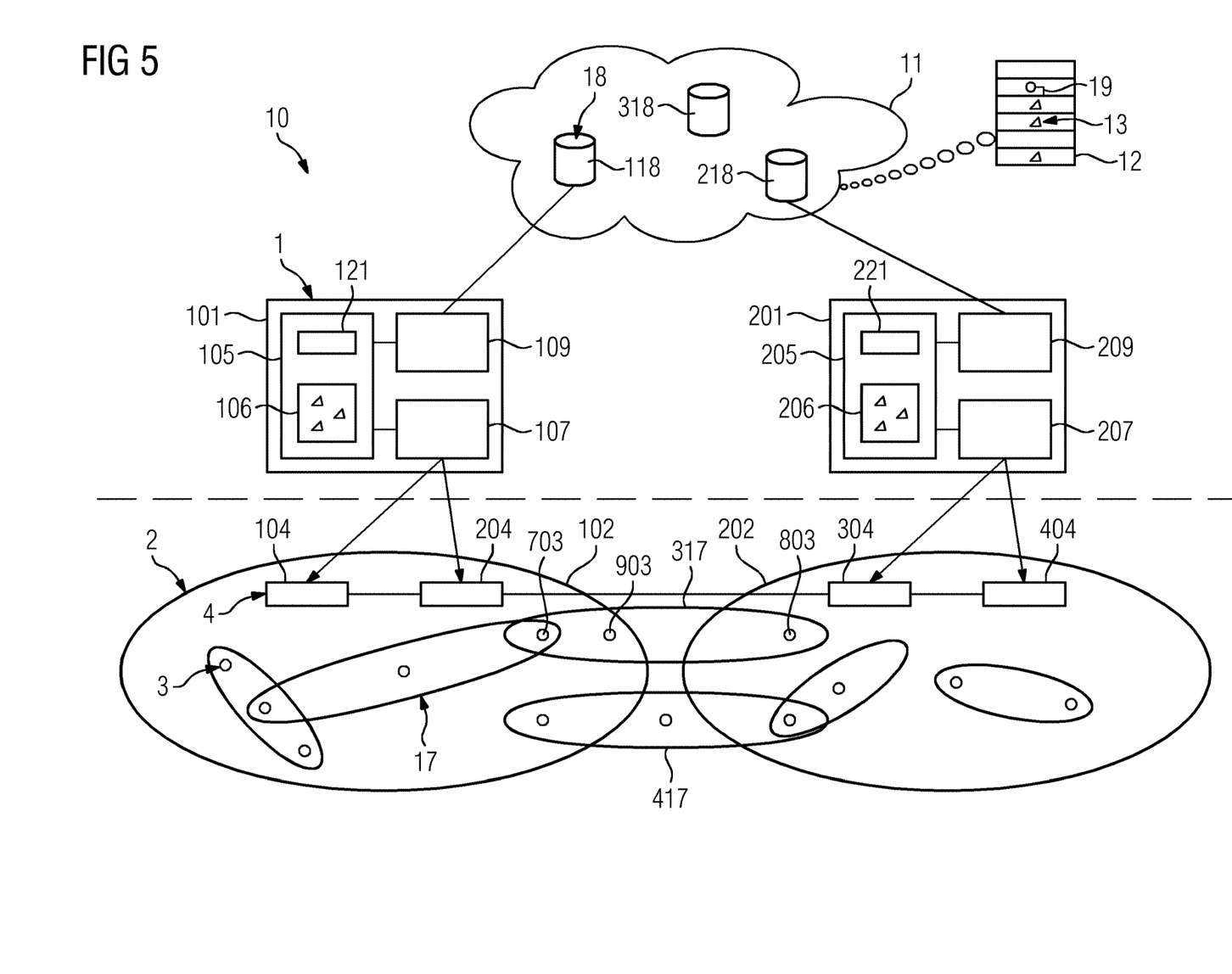
FIG. 5 shows a system for operating a software-defined network having multiple physical subareas according to a second exemplary embodiment of the teachings herein.

FIG. 5 shows a system 10 for operating a software-defined network 2 having multiple physical subareas 102, 202 according to a second exemplary embodiment. The system 10 comprises a first control apparatus 101 and a second control apparatus 102 and also multiple blockchain nodes 18, 118, 218, 318 of a blockchain 11. The software-defined network 2 comprises a first physical subarea 102 and a second physical subarea 202. A mixed virtual/physical view is illustrated for a respective physical subarea 102, 202.

On the physical level, the first physical subarea 102 is formed by two SDN switches (network elements) 104, 204 and multiple network terminals (not shown). The physical subarea 202 is formed by two SDN switches 304, 404 and multiple network terminals (not shown). The respective SDN switches 104, 204; 304, 404 of a respective one of the physical subareas 102, 202 are connected to one another. Additionally, the SDN switch 204 is connected to the SDN switch 304. The SDN switches 204, 304 therefore form a respective transfer point between the physical subareas 102, 202.

On the virtual level, a multiplicity of endpoints 3 are formed in the physical subareas 102, 202. The endpoints 3 can be services, ports, etc., of the network terminals (not shown). Furthermore, a multiplicity of virtual network areas or client network areas 17 are formed in the physical subareas 102, 202. Some of the client network areas 317, 417 extend over both physical subareas 102, 202; others only over a single one of the subareas 102, 202.

A respective one of the control apparatuses 1 of the system 10 is a respective SDN controller 101, 201. The first SDN controller 101 comprises a memory unit 105, a control unit 107 and a comparison unit 109. The memory unit 105 stores a network image 106 of the software-defined network 2 formed by the physical subareas 102, 202.

On the basis of the network image 106, the control unit 107 implements respective data stream rules in a respective one of the SDN switches 104, 204 and thereby controls the forwarding of data streams (8 in FIG. 1) by the SDN switches 104, 204. The data stream rules are set up so as, when implemented on the network elements 104, 204, to cause the formation of the virtual client network areas 17 (sections of the virtual client network areas 17 within the first physical subarea 102).

Furthermore, the control unit 107 continually receives quality of service information from the SDN switches 104, 204. Specifically, the control unit 107 of the first SDN controller 101 receives quality of service information from the SDN switch 204, which forms a transfer point to the second physical subarea 202, which quality of service information describes a quality of service of the second physical subarea 202 and can therefore be regarded as a measure of the credibility of the second SDN controller 201. The control unit 107 stores a time characteristic 121 for the received quality of service information in the memory unit 105.

The comparison unit 109 compares the network image 106 stored in the memory unit 105 against the network image 13 published in the ledger 12 of the blockchain 11.

For this purpose, the comparison unit 109 communicates with a blockchain node 118 assigned to the comparison unit 109. Furthermore, authorization information 19, which is for example public keys of the blockchain nodes 118, 218 and 318, is published in the ledger 12 of the blockchain 11.

The second SDN controller 201 comprises a memory unit 205 that stores a time characteristic 221 for quality of service information and a network image 206, and also a control unit 207 and a comparison unit 209. The respective units 205, 207, 209 of the second SDN controller 201 are configured in a similar manner to the corresponding units 105, 107, 109 of the first SDN controller 101.

Besides the advantage of protection against manipulation of the stored image 106 already described on the basis of the first exemplary embodiment, the comparison by the comparison units 101, 201 can afford the further advantage that, by means of the blockchain-based comparison, the SDN controllers 101 and 201 can agree on a common network image 106, 206, 13. In this way, the SDN controllers 101, 102 can jointly control the network elements 4 of a respective physical subarea 102, 202 such that client network areas 317, 417 are formed that span more than one of the physical subareas 102, 202.

The blockchain 11 in the present instance is formed from three blockchain nodes 118, 218, 318. The first blockchain node 118 is assigned to the comparison unit 109 of the first SDN controller 101. The first blockchain node 118 forms an endpoint 703 in a section of the client network area 317 that is in the first physical subarea 102. It can therefore be stated that the first blockchain node 118 is assigned to the first physical subarea 102. The second blockchain node 218 is assigned to the comparison unit 209 of the second SDN controller 201. The second blockchain node 218 forms an endpoint 803 in a section of the client network area 317 that is in the second physical subarea 202. The second blockchain node 218 is therefore assigned to the second physical subarea 202. The third blockchain node 318 is assigned to neither of the SDN controllers 101, 201. It likewise forms an endpoint 903 in the client network area 317. It can therefore be stated that the third blockchain node 318 is assigned to the virtual client network area 317.

The blockchain nodes 118, 218, 318 communicate among one another by means of data streams (8 in FIG. 1) between the endpoints 703, 803, 903 formed by them within the client network area 317 on the data level of the software-defined network 2 and hence in a public area. The comparison unit 109 of the first SDN controller 101, which is arranged in a private area, communicates with the first blockchain node 118 on a control level of the software-defined network 2. Similarly, the comparison unit 209 communicates with the second blockchain node 218 on the control level.

The client network area 317 may therefore be a client network area in the data level of the software-defined network 2 that is reserved for operation of the blockchain 11. In other words, the operators of the blockchain 11 are clients of the client network area 317.

In some embodiments, the blockchain 11 can comprise further blockchain nodes (not shown). The addition of further blockchain nodes allows the redundancy and the protection against manipulation of the blockchain 11 to be increased further. If the published network image 13 (and hence also the stored network images 106 and 206) is intended to be changed, one of the blockchain nodes 18 transmits a change request to the blockchain 11 as an unconfirmed transaction.

According to the consensus protocol of the blockchain 11 a respective one of the blockchain nodes 118, 218, 318 preferably agrees to publishing the transmitted change request as a change to the published network image 13 in the ledger 12 of the blockchain only (adopts a block comprising the change request as an unconfirmed transaction in its local copy of the ledger 12 as a confirmed block with a confirmed transaction only) if the change request is provided with a digital signature whose validity is verifiable on the basis of a public key that the authorization information 19 comprises.

In this way, it is possible to prevent change requests that are transmitted from a further blockchain node (not shown) to the blockchain 11 from being published. The further blockchain node could be a blockchain node that is operated by an attacker who has gained illegal access to the client network area 317. A further condition for establishing a consensus may be linked to a quality of service. By way of example, the blockchain node 118 checks, if a change transaction transmitted to the blockchain 11 is signed by the blockchain node 218, for example, whether the stored time characteristic 121 for the quality of service information obtained by the control unit 107 reveals that the second physical subarea 202, to which the blockchain node 218 is assigned, has been operated with an average quality of service that is higher than a predetermined threshold value for a predetermined period. If the average quality of service of the operation of the second physical subarea 202 is above the predetermined threshold value during the predetermined period, the first blockchain node 118 agrees to the consensus. Otherwise, it does not agree to the consensus.

It can therefore be stated that the blockchain 11 implements a proof-of-stake-based consensus protocol. By way of example, in this instance a proof of stake or evidence of the legitimate interest by the blockchain node 218 requesting the change comprises the signature of the change request, identifying the blockchain node 218, and the quality of service information, comprised in the time characteristic 121, about the quality of service of the second physical subarea 202 assigned to the second blockchain node 218.

The system 10 (SDN controller 101, 201 and blockchain node 18) therefore allows the formation of a software-defined wide area network 2 having multiple SDN controllers 101, 102 that compare the network images 106, 206 stored in them by means of the blockchain 11 formed by the blockchain nodes 18 in a secure manner. Unlimited mutual trust between operators of the SDN controllers 101, 201 is unnecessary in this instance. Rather, a respective SDN controller 101, 201 can gain credibility by virtue of constant operation with an adequate quality of service over the course of time and can therefore gain the authorization to request changes to the published network image 13 used for the comparison.

Although the teachings of the present disclosure has been described on the basis of exemplary embodiments, it is modifiable in a wide variety of ways. In the second exemplary embodiment, for example, a software-defined network 2 was described that comprises two physical subareas 102, 202 having a respective control apparatus 101, 201. It should be noted that a perspective in which the physical subareas 102, 202 are referred to as software-defined networks 102, 202 and the software-defined network 2 is referred to as a network interconnection is functionally equivalent.

Instead of the SDN controllers 101, 201 described in the second exemplary embodiment, the system 10 of the second exemplary embodiment can also be operated with a control apparatus 1 according to the first exemplary embodiment or the developments thereof. The consensus protocol can comprise further conditions to increase protection against manipulation.

By way of example, the consensus protocol can stipulate that the change request, when applied to the published network image, results in a changed published network image that is consistent in itself, for example contains no loops, open ends, inconsistent definitions or the like. By way of example, the blockchain 11 can implement a crypto currency system, and the consensus protocol can prescribe that a change to the published network image requires a predefined amount of crypto currency to be spent.

According to the second exemplary embodiment, a respective one of the blockchain nodes 18 forms one endpoint each in the client area 317, and the blockchain nodes 18 communicate with one another by means of data streams of the client area 317. This exemplary refinement can also be referred to as in-band blockchain or blockchain with in-band communication.

An out-of-band blockchain or a mixed form in which some of the blockchain nodes 18 communicate with one another in band and some of the blockchain nodes 18 communicate with one another out of band is also conceivable. Out-of-band communication means communication via a public network and/or communication via a network that is different than the software-defined network 2.

An out-of-band blockchain can also involve a respective blockchain node 18 being assigned to a virtual client network area 17 and/or to a physical subarea 102, 202 of the software-defined network 2. The assignment may be realized by virtue of the blockchain node 18 being managed by a client and/or an operator of a physical subarea or of a control apparatus. The assignment may be documented by virtue of a respective one of the assigned blockchain nodes 18 having an applicable digital key that is able to be used for signing transactions, change requests and the like.

The proposed control apparatuses and/or systems may be used as part of Industry 4.0, to set up a software-defined wide area network 2 with a multiplicity of network operators and clients in an industrial installation distributed over multiple sites.

What is claimed is:

1. An apparatus for operating a software-defined network having a number of network elements, the apparatus comprising:
a memory unit storing an image of the software-defined network;
a control unit programmed to use the stored image as a basis for controlling forwarding of data streams by the number of network elements; and
a comparison unit programmed to compare the stored image against a network image published in a ledger of a blockchain;
wherein the comparison unit comprises a blockchain node of the blockchain;
the blockchain node is programmed to determine whether there is a consensus to publish a change request transmitted to the blockchain for the published network image in the ledger of the blockchain based on whether the change request for the published network image is consistent with a consensus protocol of the blockchain;
the control unit is further programmed to receive quality of service information from at least one of the number of network elements;
wherein the consensus protocol of the blockchain is based on the quality of service information.

2. The apparatus as claimed in claim 1, wherein the comparison unit is further programmed to:
transmit a change to the stored image to the blockchain as a change request for the published network image;
adopt the change to the stored image if the change request for the published network image is published in the ledger of the blockchain as a change to the published network image; and
reject the change to the stored image if the change request for the published network image is not published in the ledger of the blockchain as a change to the published network image.

3. The apparatus as claimed in claim 1, wherein the comparison unit is further programmed to adopt the change to the published network image as a change to the stored image if a change request for the published network image is published in the ledger of the blockchain as a change to the published network image.

4. The control apparatus as claimed in claim 1, wherein the control unit is arranged in a private area and the blockchain node is arranged in a public area.

5. A system for operating a software-defined network having a number of network elements, the system comprising:
a number of control apparatuses, each apparatus comprising:
a respective memory unit storing an image of the software-defined network;
a respective control unit programmed to use the stored image as a basis for controlling forwarding of data streams by the number of network elements; and
a respective comparison unit programmed to compare the stored image against a network image published in a ledger of a blockchain;
multiple blockchain nodes forming the blockchain and programmed to:
exchange a change request transmitted to the blockchain for the published network image among one another; and
to publish the change request in the ledger of the blockchain as a change to the published network image only if a consensus is reached between the multiple blockchain nodes in accordance with a consensus protocol of the blockchain; and
wherein the consensus protocol of the blockchain is based on quality of service information.

6. The system as claimed in claim 5, wherein:
the individual control units are programmed to control the forwarding of data streams by the number of network elements by communicating with the number of network elements on a control level of the software-defined network; and
the multiple blockchain nodes are programmed to communicate with one another on a data level of the software-defined network and/or via a public network.

7. The system as claimed in claim 5, wherein the multiple blockchain nodes are programmed to reach the consensus to publish the change in the ledger of the blockchain on the basis of evidence of a legitimate interest by a blockchain node requesting the change.

8. The system as claimed in claim 7, wherein authorization information is published in the ledger of the blockchain, indicating those of the blockchain nodes that are authorized to request changes to the published network image, and the evidence of the legitimate interest comprises evidence that the blockchain node requesting the change is authorized to request changes to the published network image in accordance with the authorization information published in the ledger of the blockchain.

9. The system as claimed in claim 7, wherein:
   multiple virtual client network areas defined by the published network image are set up in the software-defined network; and
   a respective one from a number of the multiple blockchain nodes is respectively assigned to one of the virtual client network areas.

10. The system as claimed in claim 9, wherein the evidence of a legitimate interest comprises:
    evidence that the requesting blockchain node is assigned to one of the virtual client network areas and/or to one of the physical subareas; and
    evidence of a quality of service of the virtual client network area and/or of the physical subarea to which the requesting blockchain node is assigned.

11. The system as claimed in claim 10, wherein:
    the control unit of a respective one of the multiple control apparatuses is programmed to receive quality of service information concerning the quality of service of a number of further instances of the physical subareas from at least one from the disjunct selection of network elements of the physical subarea controlled by the control apparatus;
    the memory unit of a respective one of the multiple control apparatuses is designed to store a time characteristic of the quality of service information received by the control unit for each of the number of further physical subareas; and
    the evidence of the quality of service of the physical subarea to which the requesting blockchain node is assigned is based on the time characteristic of the quality of service information concerning the physical subarea that is stored in the memory unit of a respective one of the multiple control apparatuses.

12. The system as claimed in claim 7, wherein:
    a respective one of the control apparatuses is programmed to control a physical subarea of the software-defined network;
    a respective physical subarea is formed by a disjunct selection from the number of network elements; and
    a respective one from a number of the multiple blockchain nodes is respectively assigned to one of the physical subareas.

13. A method for operating a software-defined network having a number of network elements, the method comprising:
    storing a network image of the software-defined network in a memory unit of a control apparatus;
    controlling forwarding of data streams by the network elements on the basis of the stored network image; and
    comparing the network image stored in the memory unit of the control apparatus against a network image published in a ledger of a blockchain;
    wherein a blockchain node of the blockchain executes the comparison;
    the blockchain node is programmed to determine whether there is a consensus to publish a change request transmitted to the blockchain for the published network image in the ledger of the blockchain based on whether the change request for the published network image is consistent with a consensus protocol of the blockchain; and
    wherein the consensus protocol of the blockchain is based on the quality of service information.

\* \* \* \* \*